T. G. SPRINGER.
GAS-MACHINE.
No. 174,586. Patented March 7, 1876.
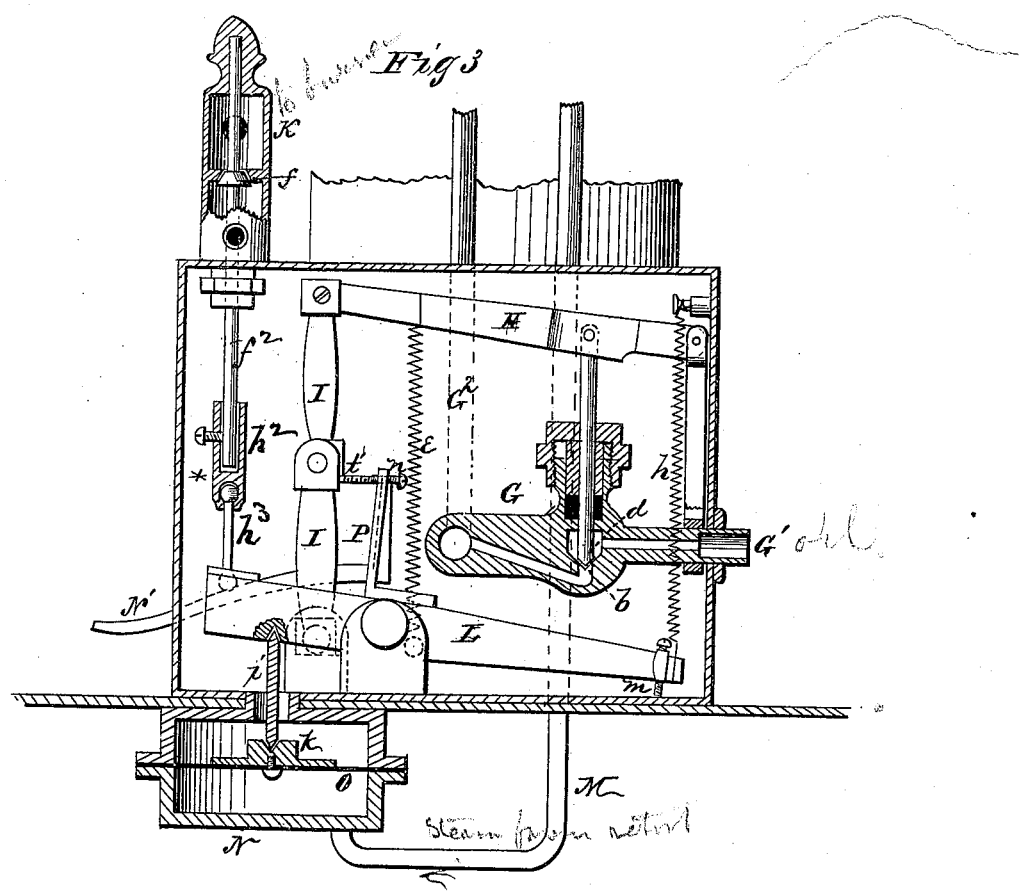
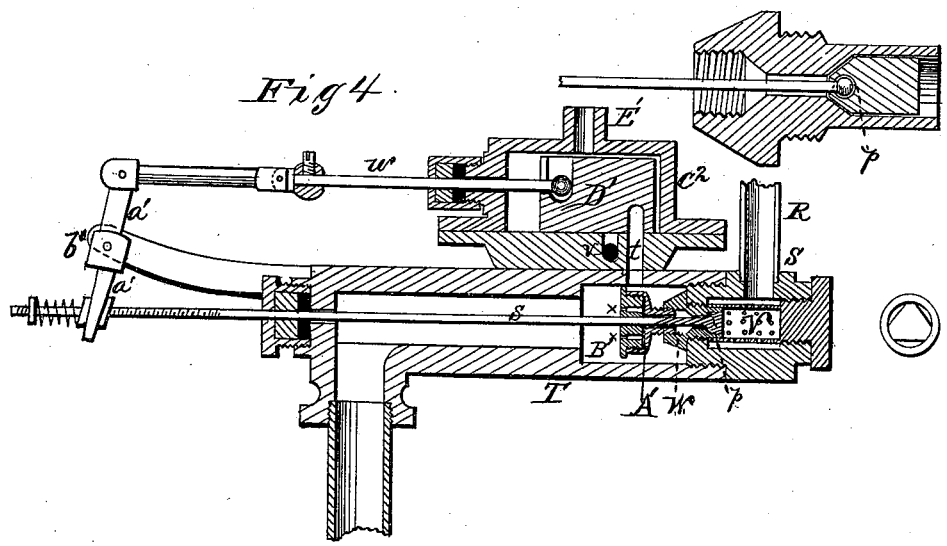
WITNESSES
INVENTOR 4 Sheets—Sheet 4.
T. G. SPRINGER.
GAS-MACHINE.
No. 174,586. Patented March 7, 1876.
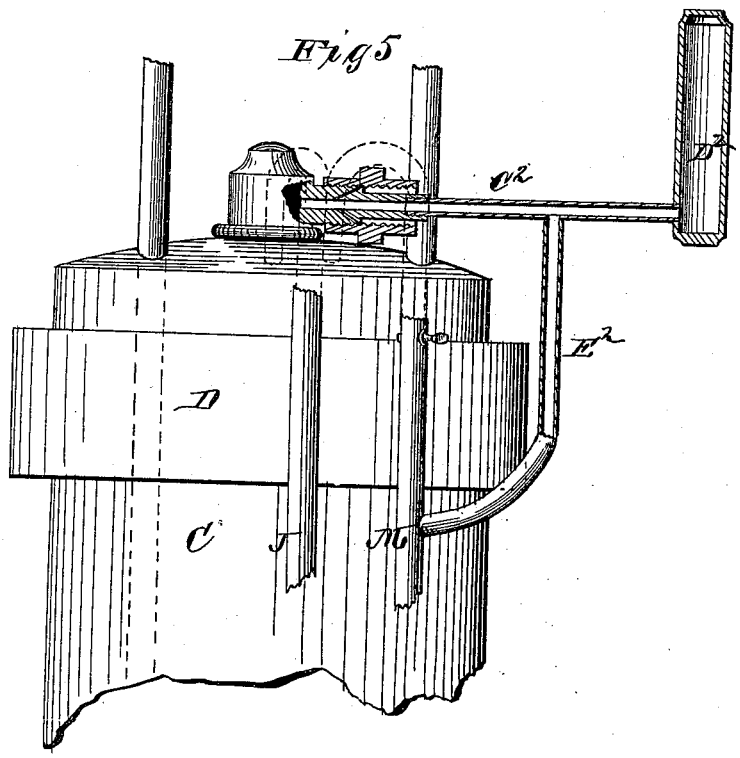

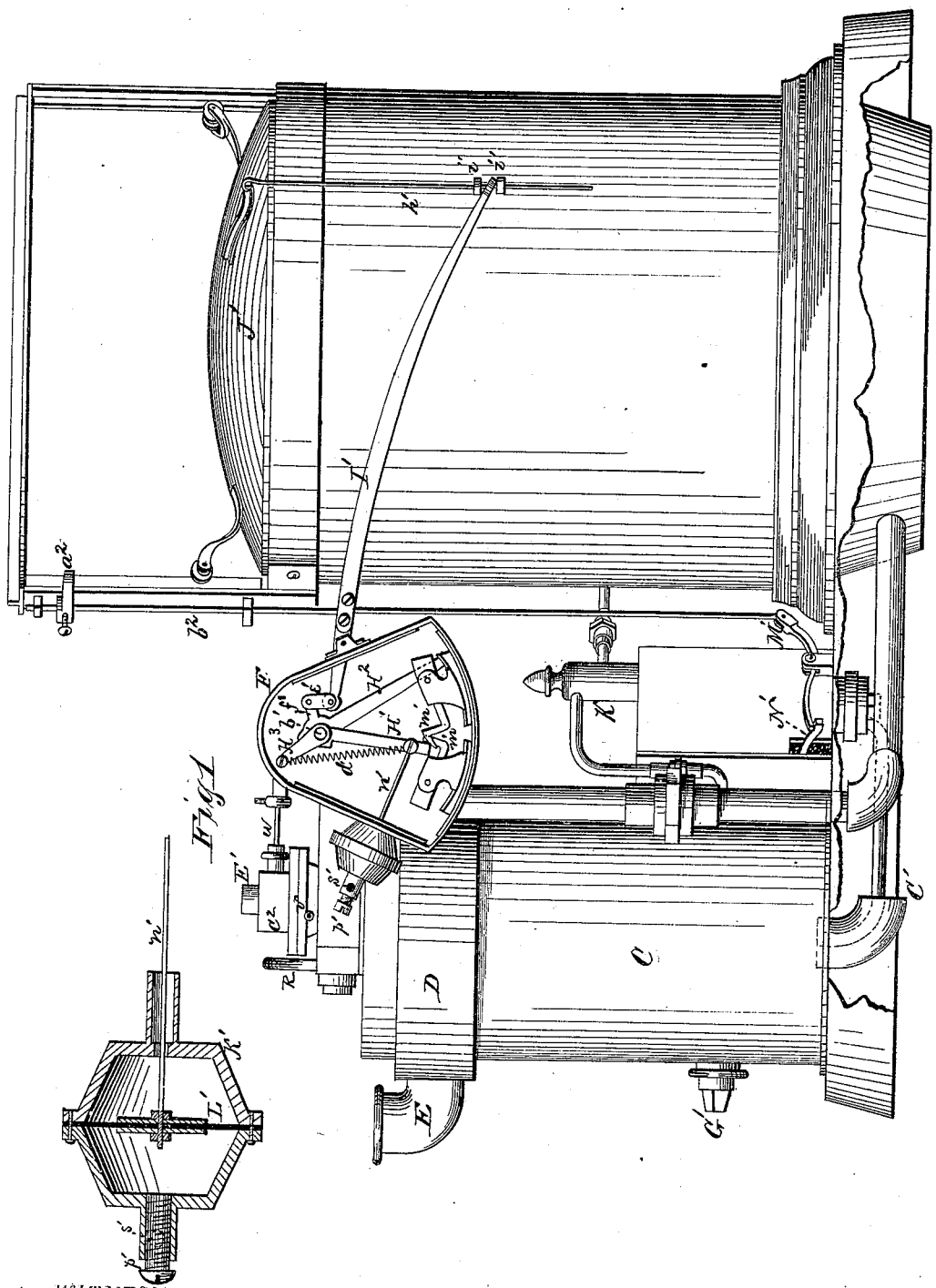

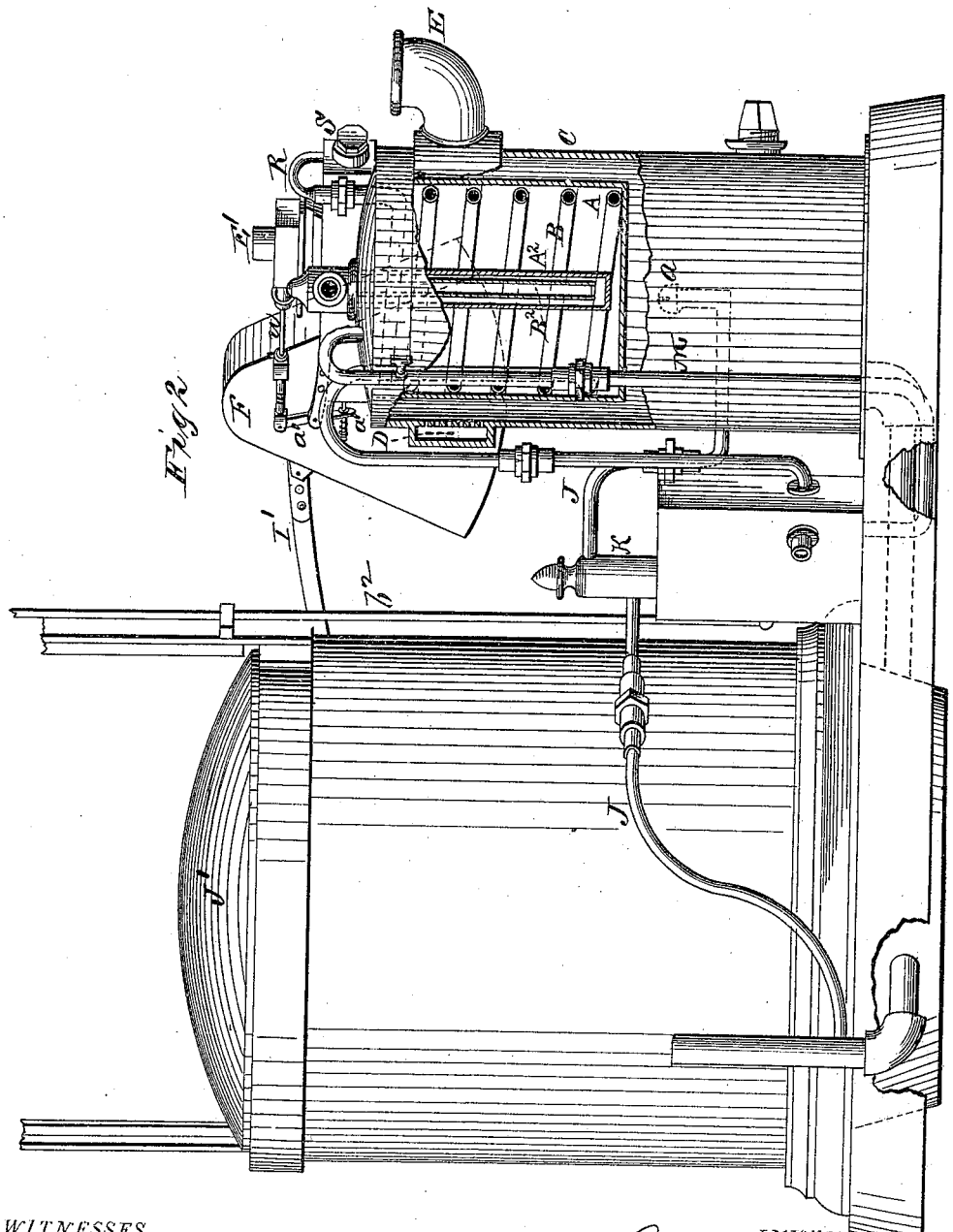

UNITED STATES PATENT OFFICE.

THEODORE G. SPRINGER, OF NEW YORK, N. Y.

IMPROVEMENT IN GAS-MACHINES.

Specification forming part of Letters Patent No. 174,586, dated March 7, 1876; application filed February 11, 1876.

*To all whom it may concern:*

Be it known that I, T. G. SPRINGER, of New York city, in the county of New York and in the State of New York, have invented certain new and useful Improvements in Gas-Machines; and do hereby declare that the following is a full, clear, and exact description thereof, reference being had to the accompanying drawings, and to the letters of reference marked thereon, making a part of this specification.

The nature of my invention consists in the construction and arrangement of a self-operating and self-regulating machine for generating gas from hydrocarbon liquids, and mixing the same with air, or with air and ordinary city gas, as will be hereinafter more fully set forth.

In order to enable others skilled in the art to which my invention appertains to make and use the same, I will now proceed to describe its construction and operation, referring to the annexed drawings, in which—

Figure 1 is a side elevation of my entire gas-machine. Fig. 2 is another side elevation, with the retort in vertical section. Figs. 3 and 4 are enlarged detailed views of parts of my machine. Fig. 5 shows an attachment for the top of the retort.

A represents the retort, or "boiler," as it may be termed, containing a coil of pipe, B, through which the hydrocarbon liquid passes to be vaporized by the action of heat from a burner, $a$, underneath the retort, heating water contained in said retort and surrounding the coil B. The retort A is surrounded by an air-tight jacket, C, having an inlet, $C^1$, in the bottom for air. Around the upper portion of the retort the jacket C is perforated, and communicates with a surrounding chamber, D, and from said chamber or flue on one side extends the exit-pipe E for the products of combustion. This circular flue, with perforations into the jacket, is simply to distribute the heat all around the retort. The oil is supplied to the coil B through a valve-chamber, G, as shown in Fig. 3, the oil or liquid being admitted into said chamber through the inlet $G^1$, and passes from it through a pipe, $G^2$, to the coil. In the chamber G is a valve-seat, $b$, with a valve, $d$, which, when closed, stops the flow of oil. This valve $d$ is, by its stems, connected with a lever, H, pivoted at one end, and at the other end provided with knuckle-jointed arms I I. These arms, when placed on a vertical line, as shown in said Fig. 3, hold the valve $d$ open, allowing the oil to flow freely to the coil in the retort. If, by any accident, the machine should get out of order, the knuckle-joint of the arms I I is at once broken, causing a spring, $e$, to draw the lever H down, closing the valve $d$, and stopping the flow of oil. The knuckle-joint of the arms I is broken by means hereinafter described. The gas to the burner $a$ is supplied from the gas-holder through a pipe, J, which is divided by means of a valve-chamber, K, having a downward-opening valve, $f$. The stem $f^2$ of this valve passes downward, and is adjustably connected to the coupling $h^2$, which, in turn, is connected, by a ball-and-socket joint, $h^3$, with one end of a lever, L, the other end of which is held up by a spring, $h$, to keep the valve $f$ open.

The water in the retort A forms steam, which passes through a pipe, M, into a chamber, N, within which is a diaphragm, O, the steam acting on the under side thereof. On top of this diaphragm is secured a metal disk, $k$, supporting in its center a pin, $i$, the upper end of which bears against and supports that end of the lever L to which the valve $f$ is connected. The ends of the pin $i$ are pointed, and placed in corresponding seats in the disk $k$ and lever L. The pressure of steam in the chamber N raises the diaphragm O, and thereby the valve $f$, so as to decrease the flame of the burner $a$, and as soon as the heat of the retort is thereby reduced the pressure of the steam is, of course, diminished, allowing the diaphragm to settle down, and opening the valve $f$ still farther, thus supplying more gas to the burner, and again increasing the heat of the retort and consequent steam-pressure. This forms, therefore, a complete self-regulating device to keep the retort at the required temperature. The valve $f$ is kept from closing entirely by a set-screw, $m$, in that end of the lever L to which the spring $h$ is attached, which prevents the other end from rising farther than required to keep the burner $a$ going. To the lever L is attached an arm, P, with set-screw $n$ through its upper end. If for any cause the machine should get out of order, so that no steam-pressure is exerted in the chamber N on the diaphragm O, this sinks, and the lever is drawn by the spring $h$ until the set-screw $n$ in the arm P strikes the knuckle-joint of the arms I I, breaking said joint, when the spring $e$ at once closes the valve $d$, and stops the flow of oil. This, of course, happens only if the water should by any means ooze out of the retort from imperfect or leaky joints, or the flame under the retort should from any cause be extinguished.

The vaporized hydrocarbon passes from the coil B through a pipe, R, into a chamber, S, within which is a cylindrical strainer, V, as shown in Fig. 4.

The chamber S is closed at its outer end, and provided at its inner end with a mouth-piece, W, forming a valve-seat for a valve, $p$, which opens into the strainer against the pressure of the gas; or, in other words, the pressure of the gas from the retorts has a tendency to keep the valve closed. The chamber S is screwed into an injector-tube, T, and in the mouth-piece W of said chamber is screwed a nozzle composed of two parts, $A^1$ and $B^1$. The part $A^1$ is in the form of a cup, with stem screwing into the mouth-piece W, and the part $B^1$ is a plug or disk, screwed into the part $A^1$. The plug or disk $B^1$ is provided with a series of small holes, $x\ x$, through which the gas is forced as it passes around the valve $p$ and its stem $s$.

Ordinarily, in injectors, one hole only has been used, through which the gas has been forced, and when this hole has to be large to admit a sufficient quantity of gas, the pressure has to be very great. By dividing this, and making a series of small holes instead of one large one, the same amount of gas is forced through with the same velocity with a very small pressure, which is of very great importance and advantage in the proper working of the machine.

As the gas is forced through the holes $x$ it creates a vacuum and suction, drawing in air through a passage, $t$, from a valve-chamber, $C^2$, within which is an ordinary sliding valve, $D^1$. The valve-chamber $C^2$ is provided with an inlet, $E^1$, on top, and an inlet, $v$, on one side, both of which may be used for the admission of air, or the side inlet only for the admission of air, and the top inlet for the admission of city gas, when it is desired to mix such gas with the gas made by my machine. The valve $D^1$ is provided with a rod or stem, $w$, and the two stems $w$ and $s$ are connected to arms $a^1\ a^1$, projecting in opposite directions from a rocking shaft, $b^1$.

In Fig. 4 I have shown both valves $D^1$ and $p$ closed, and they both operate together by the rocking of the shaft $b^1$, to open and close the valves.

On the end of the rocking shaft $b^1$, within a suitable case, F, are hung two levers, $H^1\ H^2$. The lever $H^1$ is fast on the shaft, while the lever $H^2$ is loose thereon. The loose lever $H^2$ has an arm, $H^3$, connected thereto, and projecting upward from the shaft, while both the levers $H^1$ and $H^2$ project downward, as shown in Fig. 1. The upper end of the arm $H^3$ and the lower end of the lever $H^1$ are connected by a spring, $d'$. The lever $H^2$ has another arm, $f^2$, connected, by links $e^2$, with the inner end of a lever, $I'$, the outer end of which is placed between two adjustable collars, $i'\ i'$, secured on a rod, $h^1$, which depends from the gas-holder $J'$. In the bottom of the case F are pivoted two weighted hooks, $m'\ m'$, which serve to lock the lever $H^1$ in its two positions, to hold, by means of the rock-shaft $b^1$ and the connections thereto, the valves $D^1$ and $p$ either open or closed. The outer or weighted end of each hook has an arm, against which the lever $H^2$ is to strike to trip the hook.

In Fig. 1 I have shown these parts in position for keeping the valves open. As gas is being made the holder $J'$ rises, and carries with it the outer end of the lever $I'$. This motion of the lever $I'$ gradually reverses the position of the lever $H^2$ and arm $H^3$ until, when the gas-holder has risen to the desired height, the end of the lever $H^2$ strikes the arm of the hook $m'$, which now holds the lever $H^1$, when this hook is tripped, releasing said lever $H^1$. The spring $d'$ at once throws the lever $H^1$ to the opposite side until it is caught by the hook $m'$ on that side, this motion of the lever $H^1$ closing the valves $D^1\ p$ and stopping the manufacture of gas. As the holder descends by the consumption of the gas the operation is reversed, so that when the holder reaches its lowest point the valves are again opened, and the manufacture of gas commences de novo.

The sudden changing of the lever $H^1$ from one side to the other would, unless otherwise provided for, create a jar of the working parts. To obviate this difficulty I connect the lower end of the lever H, by a rod, $n'$, with a flexible diaphragm, $L'$, within a chamber, $K'$, having an air-inlet, $s'$, with screw $p'$, for regulating the admission of air into the same. By this means an air-cushion is formed to relieve all jar or shock.

If from any cause the valves $D^1\ p$, or the above locking devices connected thereto, should fail to work, the gas-holder would continue to rise above the usual limit. In that case the holder would strike an adjustable arm, $a^2$, attached to a vertical sliding rod, $b^2$, and lift the same. The lower end of the rod $b^2$ is attached to a lever, $M'$, the other end of which bears on the projecting end of another lever, $N'$, pivoted within the case inclosing the oil and gas regulating devices. The inner end of the lever $N'$ is bent upward, and has a set-screw, $t'$, through it. When the holder rises far enough to operate this mechanism the screw $t'$ strikes and breaks the joint of the arms I I, whereby, as already described, the valve $d$ is closed and the flow of oil stopped.

If it is desired to use steam to vaporize the hydrocarbon liquid, instead of the flame under the retort, steam is to be admitted into the retort from a boiler through any suitable connecting-pipe; and in the center of the retort is a vertical pipe or cylinder, $A^2$, closed at its lower end, and containing water. Within this cylinder is a pipe, $B^2$, open at its lower end, and communicating with an exterior horizontal pipe, $C^2$, which leads to a vertical air-chamber, $D^2$. The pipe $C^2$ is then, by a pipe, $E^2$, connected with the pipe M, leading to the chamber N. By the action of the steam in the retort the oil in the coil B is vaporized, and the water contained in the cylinder $A^2$ is heated, and rises through the pipe $B^2$ into the pipe $C^2$, compressing the air into the top of the air-chamber $D^2$, forming an air-cushion to force the steam, through the pipes $E^2$ and M, into the chamber N. With this machine, when city gas is to be mixed with the air and hydrocarbon gas, a pipe from the gas-meter is to be connected with the inlet $E^1$ of the valve-chest $C^1$, and the suction of the injector draws in both air and city gas at the same time.

In the nozzle, as above described, I may use narrow slits in place of a series of small perforations, said slits being either in the form of a circle, a cross, or other suitable form which will answer the same purpose.

Having thus fully described my invention, what I claim as new, and desire to secure by Letters Patent, is—

1. In combination with the retort A and jacket C, surrounding the same, the flue D, surrounding the jacket, and communicating with the interior thereof by suitable perforations, for the purposes herein set forth.

2. In a liquid hydrocarbon-gas machine, having a valve for letting on and shutting off the oil, the combination of a jointed arm or trigger, I I, for holding each valve open, and a mechanism for tripping said joint to close the valve automatically by the decrease of the heat of the retort below a certain fixed degree, as herein set forth.

3. The combination of the valve d, lever H, jointed arms I I, and spring e, as and for the purposes herein set forth.

4. The combination of the valve f, adjustable valve-stem $f^2$, coupling $h^2$, ball-and-socket connection $h^3$, lever L, spring h, pin i, and diaphragm O in the chamber N, into which steam is admitted from the retort, as and for the purposes herein set forth.

5. The combination of the gas-valve-operating lever L with arm P, having set-screw n, and the jointed arms I I, lever H, and oil-valve d, all substantially as and for the purposes herein set forth.

6. In an injector for gas-machines, a nozzle having a series of small perforations, or one or more slits, for the purposes herein set forth.

7. In combination with a hydrocarbon-gas machine, an oil-vapor injector connected to the gas main or pipe for the ordinary city gas, and provided with an air-inlet, whereby air and city gas are drawn in at the same time and mixed with the oil-vapor by the suction of the injector, substantially as herein set forth.

8. The combination of the chamber S, strainer V, valve p, mouth-piece W, and nozzle $A^1$ $B^1$, all constructed substantially as and for the purposes herein set forth.

9. The combination of the injector-tube T, with devices as described, and the valve-chest $C^2$, with inlets $E^1$ v, and valve $D^1$, and passage t, substantially as and for the purposes herein set forth.

10. In combination with the valves $D^1$ and p, operated simultaneously from a rocking shaft, the lever $H^1$ and one or more latches, $m'$, for holding or locking the valves in either position, as herein set forth.

11. The valve-locking device herein described, consisting of the levers $H^1$ $H^2$, arm $H^3$, spring $d'$, and latches $m'$, substantially as and for the purposes herein set forth.

12. The arm $f^1$, link $e^1$, and lever $I'$, connected to the rod $h^1$, and operated by the rise and fall of the holder, substantially as and for the purposes herein set forth.

13. The air-chamber $K'$, with inlet $s'$, and diaphragm $L'$, in combination with the rod $n'$ and lever $H^1$, substantially as and for the purposes herein set forth.

14. In combination with an oil-valve held open by a jointed arm or trigger, the levers $N'$ $M'$, rod $b^2$, and arms $a^2$, or their equivalents, for breaking said joint by the rise of the gas-holder above a certain fixed point, for the purposes herein set forth.

15. The combination, with a retort, A, having interior coil B, of the cylinder $A^2$, pipes $B^2$ $C^2$, air-chamber $D^2$, and pipes $E^2$ M, substantially as and for the purposes herein set forth.

In testimony that I claim the foregoing I have hereunto set my hand this 8th day of February, 1876.

THEO. G. SPRINGER.

Witnesses:
H. A. HALL,
J. M. MASON.